(12) United States Patent
Eide

(10) Patent No.: US 7,337,114 B2
(45) Date of Patent: Feb. 26, 2008

(54) SPEECH RECOGNITION USING DISCRIMINANT FEATURES

(75) Inventor: Ellen M. Eide, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 09/821,404

(22) Filed: Mar. 29, 2001

(65) Prior Publication Data

US 2003/0023436 A1    Jan. 30, 2003

(51) Int. Cl.
*G10L 15/00*    (2006.01)
*G10L 15/06*    (2006.01)

(52) U.S. Cl. .................... 704/243; 704/236
(58) Field of Classification Search ........ 704/254–257, 704/240, 250, 251, 242–245, 232, 236
See application file for complete search history.

(56) References Cited

U.S. PATENT DOCUMENTS

| | | | | |
|---|---|---|---|---|
| 4,926,488 | A * | 5/1990 | Nadas et al. ............... | 704/233 |
| 5,175,793 | A * | 12/1992 | Sakamoto et al. .......... | 704/200 |
| 5,822,729 | A * | 10/1998 | Glass ......................... | 704/255 |
| 5,884,261 | A * | 3/1999 | de Souza et al. ........... | 704/255 |
| 5,913,188 | A * | 6/1999 | Tzirkel-Hancock ......... | 704/223 |
| 6,049,767 | A * | 4/2000 | Printz ......................... | 704/240 |
| 6,513,004 | B1 * | 1/2003 | Rigazio et al. ............. | 704/254 |
| 6,542,866 | B1 * | 4/2003 | Jiang et al. ................. | 704/255 |
| 2002/0152069 | A1 * | 10/2002 | Gao et al. ................... | 704/240 |

OTHER PUBLICATIONS

Isolated Word Recognition Using Hidden Markov Models; Sugawara, K.; Nishimura, M.; Toshioka, K.; Okochi, M.; Kaneko, T.; Acoustics, Speech, and Signal Processing, IEEE International Conference on ICASSP '85. , vol. 10, Apr. 1985 pp. 1-4.*
"Feature Selection Methods for Hidden Markov Model-based Speech Recognition"; Nouza, J.; Pattern Recognition, Proceedings of the 13th International Conference on , vol. 2, Aug. 25-29, 1996 pp. 186-190.*
Leung et al; "Phonetic Classification Using Multi-layer Perceptrons;" Acoustics Speech, and Signal Processing, 1990. ICASSP 90., 1990 International Conference on , Apr. 3-6, 1990; pp. 525-528 vol. 1.*
Eide et al; "A Linguistic Feature Representation of the Speech Waveform;" Acoustics, Speech, and Signal Processing, 1993. ICASSP-93., 1993 IEEE International Conference on , vol. 2 , Apr. 27-30, 1993, pp. 483-486 vol. 2.*
Abrash et al; "IncorporatingLinguistic Features in a Hybrid HMM/MLP Speech Recognizer;" Acoustics, Speech, and Signal Processing, 1994. ICASSP-94., 1994 IEEE International Conference on , vol. ii, Apr. 19-22, 1994; pp. II/673-II/676 vol. 2.*

(Continued)

*Primary Examiner*—Patrick N. Edouard
*Assistant Examiner*—James S. Wozniak
(74) *Attorney, Agent, or Firm*—Ference & Associates LLC

(57) ABSTRACT

Methods and arrangements for representing the speech waveform in terms of a set of abstract, linguistic distinctions in order to derive a set of discriminative features for use in a speech recognizer. By combining the distinctive feature representation with an original waveform representation, it is possible to achieve a reduction in word error rate of 33% on an automatic speech recognition task.

17 Claims, 3 Drawing Sheets

OTHER PUBLICATIONS

K. Kirchhoff, "Robust Speech Recognition Using Articulatory Information," PhD Thesis, University of Bielefeld, Germany, Jul. 1999.*

Erier et al. "HMM Representation of Quantized Articulatory Features for Recognition of Highly Confusible Words". In ICASSP '92, vol. 1, pp. 545-548, 1992.*

Koreman et al. "Can We Use the Linguistic Information in the Signal?" Saabrücken: Institute of Phonetics WP, University of the Saarland, PHONUS 5: 47-58, 2000.*

* cited by examiner

SPEECH RECOGNITION USING DISCRIMINANT FEATURES

FIELD OF THE INVENTION

The present invention relates generally to speech recognition and to methods and arrangements for facilitating the same.

BACKGROUND OF THE INVENTION

For several decades, linguists have described speech sounds using a "distinctive feature" representation, identifying a set of physiological actions or states which serve to distinguish speech sounds from one another. Phonemes are viewed as a shorthand notation for a set of features which describe the operations of the articulators required to produce the distinctive aspects of a speech sound. For example, the phonemes "p" and "b" are produced in ways which differ only in the state of the vocal folds; "p" is produced without vibration (unvoiced) while "b" requires vibration of the vocal folds (voiced). In the distinctive feature representation, only the feature "voice" differs for these two sounds.

An evolving need has been recognized in connection with representing the speech waveform in terms of the same set of distinctive linguistic features as are used to distinguish phonemes.

SUMMARY OF THE INVENTION

At least one presently preferred embodiment of the present invention broadly contemplates applying a set of abstract, linguistic distinctions to the speech waveform in order to derive a set of discriminative features for use in a speech recognizer. By combining the distinctive feature representation with an original waveform representation, it is possible to achieve a reduction in word error rate of 33% on an automatic speech recognition task.

In one aspect, the present invention provides a method of facilitating speech recognition, the method comprising the steps of: obtaining speech input data; building a model for each feature of an original set of features; ranking the features; and building a model for each of a preselected number N of the ranked features.

In another aspect, the present invention provides an apparatus for facilitating speech recognition, the apparatus comprising: an input which obtains speech input data; a first model builder which builds a model for each feature of an original set of features; a ranking arrangement which ranks the features; and a second model builder which builds a model for each of a preselected number N of the ranked features.

Furthermore, in an additional aspect, the present invention provides a program storage device readable by machine, tangibly embodying a program of instructions executable by the machine to perform method steps for speech recognition, the method comprising the steps of: obtaining speech input data; building a model for each feature of an original set of features; ranking the features; and building a model for each of a preselected number N of the ranked features.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
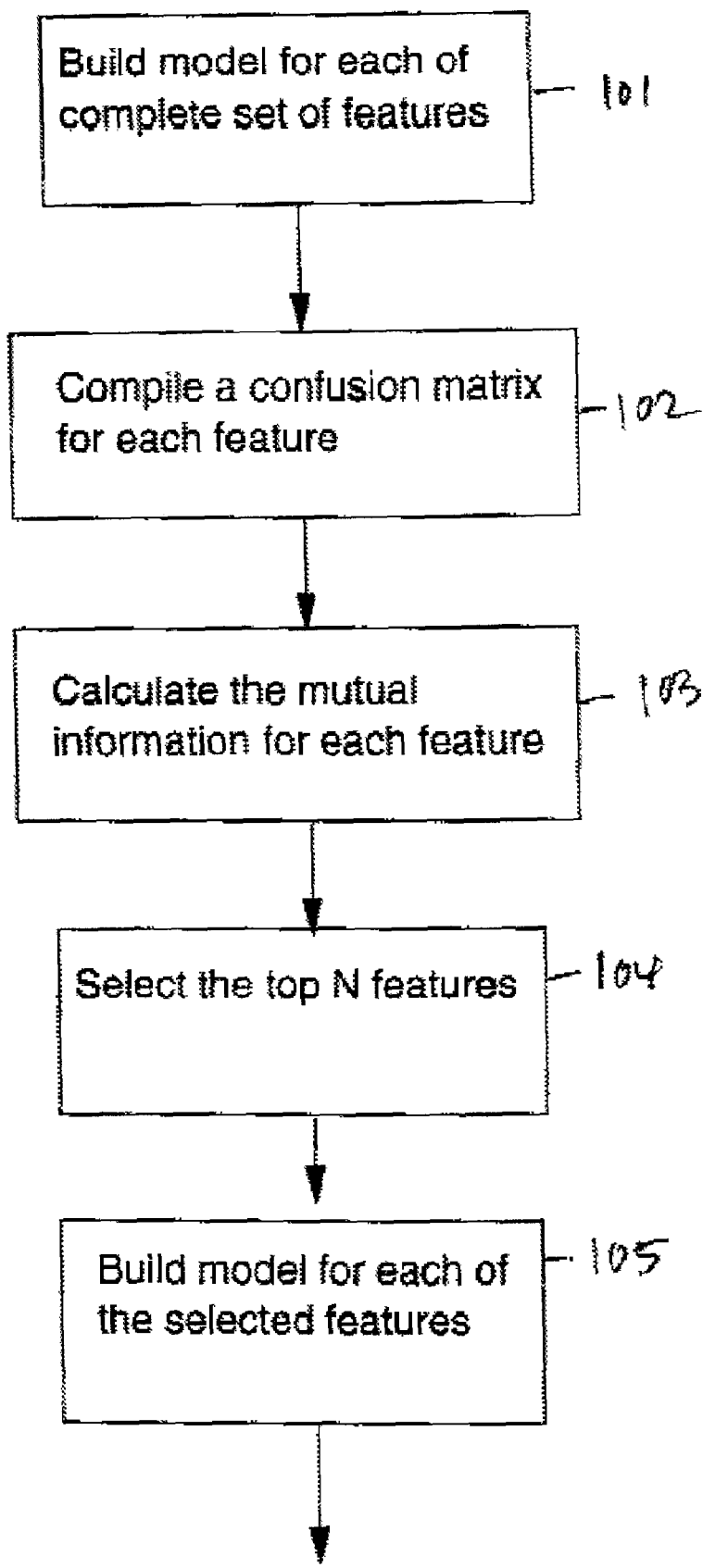
FIG. 1 schematically illustrates a process for selecting a final feature set.

Throughout the present disclosure, various terms relating to speech recognition are utilized that are generally well-known to those of ordinary skill in the art. For a more in-depth definition of such terms, any of several sources may be relied upon, including Jelinek, F. "Statistical Methods for Speech Recognition" (Cambridge, Mass.: The MIT Press, 1997).

Recognition is simply a representation at a certain level of abstraction. For example, a hidden-Markov-model-based, continuous speech recognition system (HMM) with a null grammar finds the most likely sequence of lexical items to represent a waveform, thereby representing the original signal on the word level. With a language model, an HMM represents the waveform at the phrase level. In a baseline automatic speech recognition system in accordance with at least one embodiment of the present invention, lexical entries are preferably represented as a sequence of phonemes and models the phonemes directly at the waveform level.

The present invention also broadly contemplates, in accordance with at least one presently preferred embodiment, an intermediate interface between the physical and abstract word representations, inducing processing at different levels of abstraction and representing words in terms of the distinctive features of which their phonemes are comprised.

Generally, when phoneme sequences are represented at the waveform level, as is done in a conventional baseline system, some of the phenomena which occur in conversational speech are disregarded. In particular, relaxation of the requirements on the production of a particular feature may occur.

The following discussion (relating to Table 1) is patterned after one given by Stevens, K. in "Phonetic Features and Lexical Access" (*Symposium on Advanced Man-Machine Inter-face Through Spoken Language*, November 1988, Honolulu). Consider the expression "did you" which, when pronounced carefully, corresponds to the phonemes [D-IH-D-Y-UW]. When pronounced casually, however, the result may correspond to the phonemes [D-IH-JH-UH]. Phonemically, a considerable change has taken place in going from the theoretical representation of the expression and the representation corresponding to the utterance produced.

Table 1 provides a representation of each of the pronunciations in terms of linguistic features. In the feature representation of the utterances, it can be seen that the matrix entries remain largely intact in going form the first pronunciation to the second, with only the features "anterior" and "strident" changing in the collapsing of the [D-Y] to [JH] and the feature "tense" changing in the final vowel. The task of recovering the word sequence from the second representation seems more tractable than from the original, phonemic representation. In the feature representation, distance reflects directly phonemic differences, while distance in the spectral or cepstral space may be swamped with differences which are not phonemically relevant. For example, while one may feel that the phonemes "m" and "b" are close in some perceptual space, these sounds are quite different spectrally. In the feature representation, however, they differ in only one feature, so that the intuitive proximity is captured.

Modem linguistic theory has departed from the notion of each phoneme being represented by the entire set of features. For example, since the production of vowels does not involve blocking the air flow through the vocal tract, the use of the feature continuant to describe vowels is unnecessary. The reduction of the representation to the non-redundant features describing each phoneme is efficient for the purposes of coding. However, from the viewpoint of recognition, the redundancies are desirable for recovery from errors as well as algorithm simplicity. Thus, in accordance with at least one embodiment of the present invention, the full set of feature descriptors for each phoneme is preferably kept as a type of place keeper which will allow mathematical manipulation of our results, in much the same way that vectors lying in the x-y plane are specified as [x, y, 0] in three dimensions.

TABLE 1

Table of feature perturbations in going from a careful to a casual pronunciation of "did you."

|           | D | IH | D | Y | UW | D | IH | JH | UH |
|-----------|---|----|---|---|----|---|----|----|----|
| Vocalic   | − | +  | − | − | +  | − | +  | −  | +  |
| Consonantal | + | − | + | − | −  | + | −  | +  | −  |
| High      | − | +  | − | + | +  | − | +  | +  | +  |
| Back      | − | −  | − | − | +  | − | −  | −  | +  |
| Low       | − | −  | − | − | −  | − | −  | −  | −  |
| Anterior  | + | −  | + | − | −  | + | −  | −  | −  |
| Coronal   | + | −  | + | − | −  | + | −  | +  | −  |
| Round     | − | −  | − | − | +  | − | −  | −  | +  |
| Tense     | − | −  | − | − | +  | − | −  | −  | −  |
| Voice     | + | +  | + | + | +  | + | +  | +  | +  |
| Continuant | − | + | − | + | +  | − | +  | −  | +  |
| Nasal     | − | −  | − | − | −  | − | −  | −  | −  |
| Strident  | − | −  | − | − | −  | − | −  | +  | −  |
| Labial    | − | −  | − | − | −  | − | −  | −  | −  |

Typically, in an automatic speech recognition system, statistical models are used to compare the observations derived from the input speech with the observation trajectories expected given a hypothesized word string. The most common set of observations used for representing speech in ASR systems is known as "cepstra," which consist of the inverse Fourier transform of the log of the magnitude of the short-term Fourier transform coefficients.

As it has been well established in the field of automatic speech recognition that using cepstral observation vectors leads to very good recognition results, the present invention broadly contemplates appending features to the standard cepstral representation. Preferably, the augmented observations in the standard procedure are used to train as well as to test the system.

Thus, the standard cepstral representation is preferably augmented with a set of additional features which reflect confidence in the abstract distinctive linguistic features being encoded locally in the speech waveform. The classic distinctive feature set laid out by Chomsky, N. and M. Halle in "Sound Pattern of English" (New York: Harper and Row, 1968) is considered. The waveform is preferably modeled under the presence and absence of each of a complete set of distinctive features; the set of features modeled is then preferably pruned, based on a mutual information criterion as will be described herebelow.

First, a general discussion of a broadly-based process, which may be utilized in accordance with the embodiments of the present invention, will be discussed with reference to the accompanying drawings. Then, a more detailed discussion of a preferred embodiment of the invention, which has its foundation the process illustrated in the drawings, will be discussed in connection with additional tables that are provided.

In FIG. 1, the procedure for choosing a subset of features to model, in accordance with at least one presently preferred embodiment of the present invention, is outlined. The first step (101) is to build a model for each of a complete set of features. The model building procedure will be detailed in FIG. 2.

After a model for each feature is built, one may then preferably compile a confusion matrix for each feature (102). This step includes first evaluating each frame of training data in the feature present and feature absent model and computing the score for the feature as the log of the ratio of the likelihoods. That score is then preferably compared with a threshold (set to zero) and all frames whose score falls below the threshold are preferably labeled "feature absent" while all frames with a score greater than or equal to the threshold are preferably labeled "feature present." Each frame then gets put into one of four categories (a confusion matrix) based on whether the feature was truly absent or present and whether the that feature is labeled as absent or present based on the threshold test. These data are then used to calculate the mutual information between the truth and the labels for that feature.

At 103, the mutual information calculated from the confusion matrix for each feature are ranked and the top N features are retained (104). Here, N=4.

Figure 2:
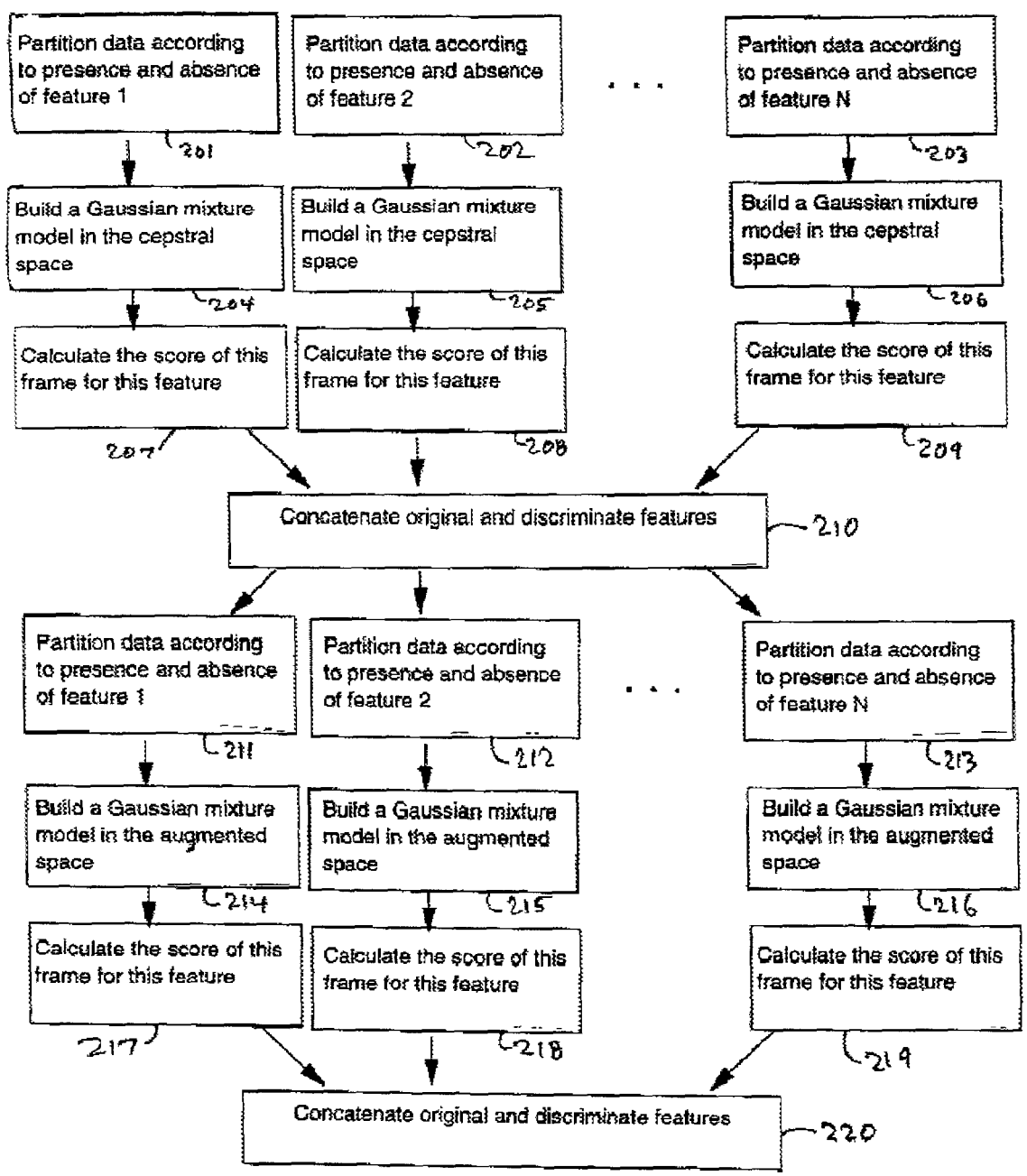
FIG. 2 schematically illustrates a process for generating observations for training sentences.

Finally, at 105, models are rebuilt for those N features in a manner such as that described herebelow in connection with FIG. 2. The models from 101 and 105 differ in the second stage of the build where the input features are 26-dimensional (13 original+13 discriminative) and 17-dimensional (13 original+4 discriminative.)

The procedure for building a feature model to generate observations is shown in FIG. 2. Partitioning of the data is carried out N times in parallel (201-203), once for each of the features to be modeled. (Thus, although only three separate partitioning tasks are shown in FIG. 2, indicated at 201, 202 and 203, corresponding to features 1, 2 and N, respectively, it is to be understood that additional partitioning tasks are contemplated if the number of features N is greater than three, e.g., tasks corresponding to feature 3, 4, etc., up to feature N−1. A similar assumption holds for other tasks in FIGS. 2 and 3 that are shown in three columns, i.e., tasks 204-206, 207-209, 211-213, 214-216, 217-219, 301-303 and 305-307.) For each feature, the training data is divided into a set of frames corresponding to the presence of that feature and a complementary set corresponding to the absence of that feature (for example voiced vs. unvoiced frames.)

The next step in a preferred embodiment of the present invention is to build a Gaussian mixture model in the original feature space (204-206) for the "feature present" and "feature absent" partitions for each feature.

Next, the score of each frame for each feature is calculated by taking the log of the ratio of the likelihoods coming from the present and absent models (207-209). At this stage, the result is an N-dimensional observation vector, where N is the number of features modeled, which is concatenated with the original observation vector for each frame (210).

Having completed the first stage in the processing, one may then preferably recalculate the discriminative features using the output of 210 as the set of observations. The second stage of processing is preferably begun by repartitioning the data (211-213) in essentially the same way as was done in steps 201-203. For each partition under each feature, one may preferably rebuild Gaussian mixture models in the augmented observation space (214-216) and evaluate those models to generate a score of each augmented vector for each feature (217-219). Those scores are then concatenated (220) with the original observation vectors to produce the final observations. These observations are used to train an automatic speech recognition system in the usual way (i.e., via running the Expectation-Maximization [EM] algorithm [discussed further below] to estimate model parameters given the observations and the transcription of the utterance).

Figure 3:
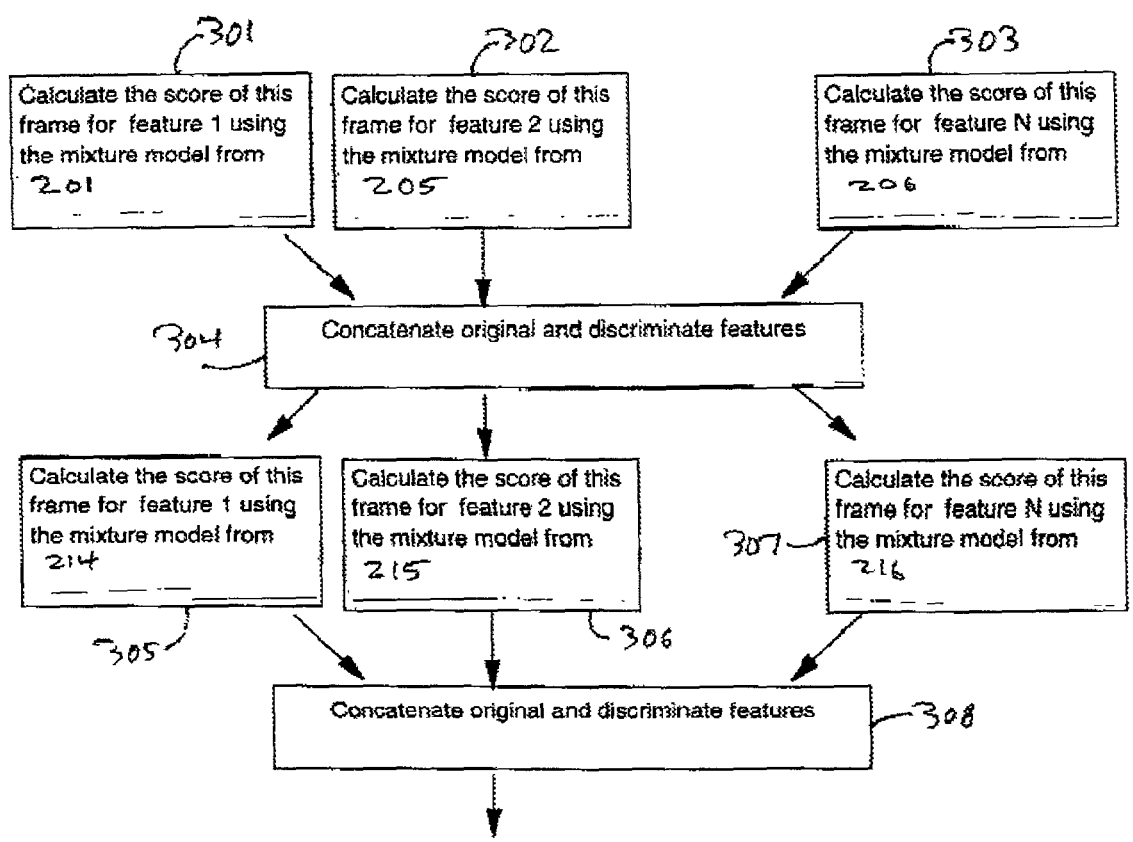
FIG. 3 schematically illustrates a process for generating observations for testing sentences.

Preferably, the discriminative feature models built as detailed in FIG. 2 are used to generate the observations for test sentences as shown in FIG. 3. At steps 301-303, the Gaussian mixture models built in the first stage of training (from steps 204-206 in FIG. 2) are preferably evaluated in the original observation space and a score for each distinctive feature is generated according to the log-likelihood ratio as was done on the training data in steps 207-209 of FIG. 2. The N-dimensional outputs are preferably used to augment the original cepstral observations for each frame in step 304. In steps 305-307, the augmented observation vector is then preferably used to evaluate the Gaussian mixture model built in the augmented space as was depicted in steps 214-216 of FIG. 2, and a score for each feature is calculated using the log-likelihood ratio as was done for the training data in steps 217-219 of FIG. 2. The outputs of steps 305-307 are then preferably concatenated with the original cepstral observations from step 308 and the resulting augmented observation vector is used to decode the test utterance in the usual way (i.e., via finding the most-likely word sequence given the observations and models).

A more detailed discussion of a preferred embodiment of the present invention now follows, building upon the general process illustrated in FIGS. 1-3.

Preferably, the procedure for constructing the feature models is iterative. First, a model is built for each of a complete set of features (i.e., a set of features which fully distinguishes all sounds in the language.) The features are then preferably ranked according to their discriminative power, and then the system is rebuilt using a subset of the most powerful features. Furthermore, each system build has two stages; initial feature models are built using only cepstra as input and the output of those initial models are used to produce an augmented set of observations which are used to construct a second set of models.

In contrast with earlier attempts to represent the speech waveform in terms of distinctive features, it is proposed herein that a discriminative scoring technique rather than maximum likelihood estimation be used. Furthermore, a feature selection criterion is preferably incorporated which enables the use of the most powerful subset of features rather than requiring the entire set to be modeled. Finally, these features are preferably an augmentation of the original cepstral observations rather than a replacement of them.

First, the training data is preferably partitioned into portions coming from male speakers and from female speakers. Two sets of feature models, one from each gender, are then built separately.

For each gender, for each feature to be modeled, all of the frames of training data are preferably divided into two sections: a set of frames corresponding to the feature being present and a complementary set corresponding to the absence of that feature. For example, for the feature "voice", all the training data are preferably divided so that all frames corresponding to unvoiced sounds are labeled "absent" and all frames representing voiced sounds are labeled "present." Partitioning of the data is preferably carried out N times in parallel, once for each of the N features to be modeled.

For each feature, from the set of frames labeled "absent", a Gaussian mixture model is preferably estimated using the original 13-dimensional cepstra vectors as observations. The same algorithm is preferably used to estimate a mixture model of the frames labeled "present." Each mixture model has on the order of 1200 Gaussians.

The mixture models are preferably used to assign a feature value to each frame in the training set. In order to assign a value for a given feature to a given frame, one may preferably evaluate $\log(p_p/p_a)$, where $p_p$ is the likelihood of that frame in the feature present model and $p_a$ is the likelihood of that frame in the feature absent model.

This procedure is carried out for each of the N features being modeled, yielding an N-dimensional vector of observations for each frame.

These observations are concatenated to the original 13-dimensional cepstra to form a (13+N)-dimensional observation vector for each frame.

Having completed the first stage in the processing, the discriminative features are preferably recalculated using the (13+N)-dimensional output of the first stage as the observations for the second stage of processing.

The second stage of processing preferably begins by partitioning the data for each feature into "feature present" and "feature absent" subsets in exactly the same way as was done in the first iteration.

For each partition under each feature, Gaussian mixture models are preferably rebuilt in the augmented observation space for the "feature present" and "feature absent" sets, and those (13+N)-dimensional models are evaluated to generate a score of each augmented vector for each feature, calculating $\log(p_p/p_a)$ in order to assign a feature value to the frame for this iteration.

The N-dimensional output of the second iteration of modeling is then concatenated with the original observation vectors to produce the final observations; these observations are used to train the speech recognition system using the EM algorithm (Expectation-Maximization Algorithm, as discussed in Jelinek, supra; a standard method for training a speech model) in the same way that the original observations were used for the baseline system.

In the initial build of the system, where all of the Chomsky-Halle features are modeled, N=14. In the final system, where only a subset of the features is modeled as will be described herebelow, the two-stage algorithm described hereinabove is preferably repeated with N=4.

Preferably, one will next obtain a subset of the initial distinctive features which are most reliably estimated so as to maximize the benefit of the additional features.

For the initial feature set, which fully distinguishes all sounds in the language, one may preferably use fourteen articulatory features as described by Chomsky and Halle, supra. A model is preferably built for each of these features, the information provided is examined and a subset of those features which provided the most information is retained.

Each of the original feature models produces a score for each frame in the training data which is the log of the ratio of the likelihood of the feature present in the waveform in the neighborhood of that frame vs. the likelihood of the feature being absent.

Preferably, "feature present" is the classification given to all frames in the training data which have a score greater than or equal to zero, and as "feature absent" all frames which have a negative score. Results are tabulated in a confusion matrix from which the mutual information between the truth and the estimate for that feature is computed. The mutual information provided by the features are ranked and only the top N features are retained in the second generation model. As an example, N=4 may be chosen, which results in the retention of the features "voice," "strident," "vocalic," and "continuant" in the final model. It has been found that choosing N=5 or N=6 yields similar recognition results, while increasing N to 7 or greater leads to increasing word error rates. This reflects an inability to accurately model, and therefore reliably estimate, a number of the abstract features, at least with the particular signal processing chosen. However, as will be seen by looking at the results, having a reliable estimate of the features chosen, even though they alone do not completely distinguish the phonemes, yields substantial gains in recognition performance.

Table 2 shows the mutual information for each of the features. As indicated by the table, the information provided by the estimate of whether the feature is present or absent about the true presence of the feature differs greatly among the features, with the estimate for the feature "voice" being the most informative and that of the feature "tense" being the least. The lack of information for that feature stems from incorrect classifications as well as from an imbalance in the frequency of occurrence; it has been found that the feature "tense" tends to be present on a frame-by-frame basis in the training much less frequently than it is absent.

TABLE 2

| Feature | MI | Feature | MI |
|---|---|---|---|
| voice | 0.559 | round | 0.231 |
| strident | 0.552 | anterior | 0.206 |
| vocalic | 0.459 | high | 0.185 |
| continuant | 0.366 | coronal | 0.172 |
| labial | 0.260 | low | 0.159 |
| nasal | 0.248 | back | 0.141 |
| consonantal | 0.246 | tense | 0.120 |

In a preferred embodiment of the present invention, the top 4 features may be retained in the final system. Having selected a subset of features to consider, one may then rebuild the models using only the selected features. The rebuilding process mimics the two-stage procedure described above, except that the augmented (13+N)-dimensional observation vector becomes 17-dimensional instead of 27-dimensional as was used when modeling the complete set of features.

As was described above, from the second-stage feature models, one may preferably calculate a score based on the log-likelihood ratio under the hypotheses of feature present and feature absent for each of the retained features and append those scores as four additional features to the usual cepstral representation.

It is to be noted that the method of feature subset selection differs from the information-theoretic criterion used in Kirchhoff, K., "Robust Speech Recognition Using Articulatory Information" (International Computer Science Institute Technical Report TR-98-037, August, 1998), in that one looks at the information about the true feature presence or absence provided by the estimates of each of the features. More particularly, processing in accordance with at least one preferred embodiment of the present invention is done independently for each feature and is not aimed at reducing dimensions based on correlations among features; rather, here one preferably seeks to model only those features whose model will prove to be useful for phonemic discrimination.

Furthermore, this selection criterion outperformed an LDA approach, possibly due to the varied spectral content of the various phones which represent a feature, resulting in multimodal, overlapping densities making linear separability unlikely (Duda, R., P. Hart, and D. Stork. "Pattern Classification." New York: John Wiley and Sons, Inc, 2001).

The procedure for calculating the features for test utterances requires two stages of processing. The discriminative feature models built in each of the two stages of processing as detailed above are used to generate the observations for test sentences. The Gaussian mixture models built in the first stage of training are evaluated in the original observation space and a score for each of the four retained distinctive features is generated according to the log-likelihood ratio as was done on the training data. The 4-dimensional output of this stage of processing is used to augment the original 13-dimensional cepstral observations for each test frame; the 17-dimensional observation vector is then used to evaluate the Gaussian mixture model which was built in the augmented space and a score for each feature is calculated using the log-likelihood ratio as was done for the training data. The 4-dimensional output of the second stage of scoring is then concatenated with the original 13-dimensional cepstral observations in and the resulting 17-dimensional observation vector is used to decode the test utterance in the usual way (i.e., via finding the most-likely word sequence given the observations and models).

Shown in Table 3 are the results on an in-house data set which is characterized by city and street names spoken in a car, with the engine running and moving at 0, 30, and 60 mph. The baseline system is the state-of-the-art low-resource system, over which improvements of 33 percent in word error rate and 22 percent in string error rate have been demonstrated. ("Baseline system" refers to training a model using the same data presented herein, but with the 13-dimensionsl cepstra as observations, then decoding that model again using just the 13-dimensional cepstra as the observations.) Similar performance improvements have been observed in connection with digit tasks for this recognizer. ("Digit tasks" refers to decoding sentences which contain only digit sequences, e.g., someone saying phone numbers).

TABLE 3

| Speed | Baseline WER/SER | Features WER/SER |
|---|---|---|
| 00 | 3.96/13.38 | 2.69/10.31 |
| 30 | 6.59/19.85 | 4.23/15.15 |
| 60 | 17.85/42.85 | 11.85/33.85 |
| average | 9.47/25.36 | 6.26/19.77 |

An analysis of the results was performed in order to gain a better understanding of why the gains were achieved. First, it was noticed that because the baseline system was a gender-independent one while the discriminative features system was built gender-dependently that even though the Gaussians from the baseline system were used to initialize the EM training in the features model, by splitting it according to gender the number of Gaussians had effectively been increased. Thus, an experiment was performed in which the features were estimated in a gender-dependent way, but the resulting observations were used to run the EM training gender-independently. In this case the number of Gaussians in the baseline and feature systems were identical. Doing so indicated a gain in word error rate of 25 percent due to the features which means the gender-dependence and corresponding increase in the number of Gaussians contributed the remaining 8 percent of the reduction in the error rate quoted in Table 3.

An improvement was noticed in distinctions such as "eightieth" vs. "eighteenth" which may be distinguished by the feature "continuant" and "five" versus "nine" which are distinguished by the features "voice" and "strident."

Other references that disclose background information that may be of assistance in appreciating the context in which at least one presently preferred embodiment of the present invention may be employed are: Deng, L. and D. Sun., "A Statistical Approach to ASR Using Atomic Units Constructed from Overlapping Articulatory Features" (*Journal of the Acoustical Society of America*, Volume 95, Issue 5, May 1994, pp. 2702-2719) and Eide, E., "A Linguistic Feature Representation of the Speech Waveform," PhD Thesis, Massachusetts Institute of Technology, 1993.

It is to be understood that the present invention, in accordance with at least one presently preferred embodiment, includes an input medium which obtains speech input data, a first model builder which builds a model for each feature of an original set of features, a ranking arrangement which ranks the features, and a second model builder which builds a model for each of a preselected number N of the ranked features. Together, the input medium, first model builder, ranking arrangement and second model builder may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating speech recognition, said method comprising the steps of:
    obtaining speech input data;
    building a model for each feature of an original set of linguistic features, wherein the model reflects whether or not each feature is present;
    ranking the linguistic features;
    rebuilding the model for each of a preselected number N of the ranked linguistic features; and
    compiling a confusion matrix for each feature of the original set of features subsequent to said step of building a model for each feature of an original set of features, wherein said compiling a confusion matrix comprises:
        computing a score for each feature based on the likelihood of its presence in a frame of the speech input data, and
        calculating mutual information between truth and labels for each feature;
    wherein the ranking comprises ranking the mutual information calculated in compiling the confusion matrix.

2. The method according to claim 1, wherein said step of building a model for each of a preselected number N of the ranked features comprises building a model for the top N ranked features.

3. The method according to claim 1, wherein said step of computing a score for each feature comprises computing a score as a log-likelihood ratio.

4. The method according to claim 1, wherein said step of compiling a confusion matrix further comprises comparing each score of each feature with a threshold.

5. The method according to claim 1, wherein said step of building a model for each feature of an original set of features comprises:
    partitioning the speech input data in parallel, once for ezich feature; and
    producing an observation vector.

6. The method according to claim 5, wherein said step of building a model for each feature of an original set of features comprises:
    partitioning data in parallel from the observation vector, once for each feature; and
    producing final observations.

7. The method according to claim 1, wherein said step of building a model for each of a preselected number N of the ranked features comprises:
    partitioning the speech input data in parallel, once for each feature; and
    producing an observation vector.

8. The method according to claim 7, wherein said step of building a model for each of a preselected number N of the ranked features comprises:
    partitioning data in parallel from the observation vector, once for each feature; and
    producing final observations.

9. An apparatus for facilitating speech recognition, said method tomprising the steps of:
    an input medium which obtains speech input data;
    a first model builder which builds a model for each feature of an orininal set of linguistic features, wherein the model reflects whether or not each feature is present;
    a ranking arrangement which ranks the linguistic features;
    a second model builder which rebuilds the model for each of a preselected number N of the ranked linguistic features; and
    a matrix compiler which compiles a confusion matrix for each feature of the original set of features subsequent to said step of building a model for each feature of an original set of features, wherein said matrix compiler is adapted to:
    compute a score for each feature based on the likelihood of its presence in a frame of the speech input data, and
    calculate mutual information between truth and labels for each feature;
    wherein said ranking arrangement is adapted to rank the mutual information calculated in compiling the confusion matrix.

10. The apparatus according to claim 9, wherein said second model builder is adapted to build a model for the top N ranked features.

11. The apparatus according to claim 9, wherein said matrix compiler is adapted to compute a score as a log-likelihood ratio.

12. The apparatus according to claim 9, wherein said matrix compiler is adapted to compare each score of each feature with a threshold.

13. The apparatus according to claim 9, wherein said first model builder is adapted to:
   partition the speech input data in parallel, once for each feature; and
   produce an observation vector.

14. The apparatus according to claim 13, wherein said first model builder is adapted to:
   partition data in parallel from the observation vector, once for each feature; and
   produce final observations.

15. The apparatus according to claim 9, wherein said second model builder is adapted to:
   partition the speech input data in parallel, once for each feature; and
   produce an observation vector.

16. The apparatus according to claim 15, wherein said second model builder is adapted to:
   partition data in parallel from the observation vector, once for each feature; and
   produce final observations.

17. A program storage device readable by computer, tangibly embodying a program of instructions executable by the computer to perform method steps for speech recognition, said method comprising the steps of:
   obtaining speech input data;
   building a model for each feature of an original set of linguistic features, wherein the model reflects whether or not each feature is present;
   ranking the linguistic features;
   rebuilding the model for each of a preselected number N of the ranked linguistic features; and
   compiling a confusion matrix for each feature of the original set of features subsequent to said step of building a model for each feature of an original set of features, wherein said compiling a confusion matrix comprises:
      computing a score for each feature based on the likelihood of its presence in a frame of the speech input data, and
      calculating mutual information between truth and labels for each feature;
   wherein the ranking comprises ranking the mutual information calculated in compiling the confusion matrix.

* * * * *